United States Patent
Haynes et al.

(10) Patent No.: US 9,533,262 B2
(45) Date of Patent: Jan. 3, 2017

(54) COMPOSITE POLYAMIDE MEMBRANE INCLUDING DISSOLVABLE POLYMER COATING

(71) Applicant: Dow Global Technologies LLC, Midland, MI (US)

(72) Inventors: Thomas N. Haynes, Eden Prairie, MN (US); Allyn R. Marsh, III, Lakeville, MN (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/758,575

(22) PCT Filed: Feb. 28, 2014

(86) PCT No.: PCT/US2014/019181
§ 371 (c)(1),
(2) Date: Jun. 30, 2015

(87) PCT Pub. No.: WO2014/158660
PCT Pub. Date: Oct. 2, 2014

(65) Prior Publication Data
US 2015/0367288 A1    Dec. 24, 2015

Related U.S. Application Data

(60) Provisional application No. 61/781,250, filed on Mar. 14, 2013.

(51) Int. Cl.
| | | |
|---|---|---|
| *B01D 67/00* | (2006.01) | |
| *B01D 71/56* | (2006.01) | |
| *B01D 71/12* | (2006.01) | |
| *B01D 65/00* | (2006.01) | |
| *B01D 61/00* | (2006.01) | |

(52) U.S. Cl.
CPC ....... *B01D 67/0088* (2013.01); *B01D 67/0095* (2013.01); *B01D 67/0097* (2013.01); *B01D 71/12* (2013.01); *B01D 71/56* (2013.01); *B01D 67/0006* (2013.01); *B01D 2323/46* (2013.01); *B01D 2325/28* (2013.01)

(58) Field of Classification Search
CPC ............ B01D 65/0006; B01D 67/0081; B01D 67/0097
See application file for complete search history.

(56) References Cited

U.S. PATENT DOCUMENTS

| | | |
|---|---|---|
| 3,744,642 A | 7/1973 | Scala et al. |
| 4,277,344 A | 7/1981 | Cadotte |
| 4,293,420 A | 10/1981 | Applegate et al. |
| 4,778,596 A | 10/1988 | Linder et al. |
| 4,830,885 A | 5/1989 | Tran et al. |
| 4,968,533 A | 11/1990 | Gsell |
| 4,983,291 A | 1/1991 | Chau et al. |
| 5,049,282 A | 9/1991 | Linder et al. |
| 5,091,086 A | 2/1992 | Stengaard |
| 5,173,335 A * | 12/1992 | Arthur ................. B01D 69/125 427/245 |
| 5,397,695 A | 3/1995 | Sutton et al. |
| 6,112,908 A | 9/2000 | Michaels |
| 6,162,358 A * | 12/2000 | Li ........................... B01D 71/56 210/490 |
| 6,177,011 B1 | 1/2001 | Hachisuka |
| 6,280,853 B1 | 8/2001 | Mickols |
| 6,811,842 B1 * | 11/2004 | Ehrnsperger .......... A61F 13/537 210/321.6 |
| 6,878,278 B2 | 4/2005 | Mickols |
| 6,960,297 B2 | 11/2005 | Kozawa et al. |
| 7,156,997 B2 | 1/2007 | Marsh et al. |
| 7,491,215 B2 | 2/2009 | Vale et al. |
| 7,815,987 B2 | 10/2010 | Mickols et al. |
| 7,905,361 B2 | 3/2011 | Niu et al. |
| 7,918,349 B2 | 4/2011 | Mickols et al. |
| 8,002,120 B2 | 8/2011 | Niu et al. |
| 8,017,050 B2 | 9/2011 | Freeman et al. |
| 8,513,320 B2 | 8/2013 | Rooijmans |
| 8,562,876 B2 | 10/2013 | Sternberg |
| 8,617,395 B2 | 12/2013 | Offeman et al. |
| 2006/0249447 A1 | 11/2006 | Yeager |
| 2008/0004205 A1* | 1/2008 | Tkacik ................. B01D 61/145 210/500.21 |
| 2009/0078640 A1 | 3/2009 | Chu et al. |
| 2009/0142850 A1* | 6/2009 | Meathrel ................ A61K 9/006 436/87 |
| 2010/0133172 A1 | 6/2010 | Song et al. |
| 2011/0027599 A1* | 2/2011 | Hoek .................... B01D 61/027 428/476.3 |
| 2011/0220569 A1 | 9/2011 | Mickols et al. |
| 2011/0259817 A1 | 10/2011 | Mickols et al. |
| 2012/0048805 A1 | 3/2012 | McCutcheon et al. |
| 2012/0080147 A1* | 4/2012 | Offeman ................ B01D 71/80 156/305 |
| 2012/0111791 A1 | 5/2012 | Freeman et al. |

FOREIGN PATENT DOCUMENTS

| | | |
|---|---|---|
| EP | 1095651 | 5/2001 |
| JP | 2001327840 | 11/2001 |
| JP | 2007289927 | 11/2007 |
| JP | 2011157523 | 8/2011 |
| JP | 2012135757 | 7/2012 |
| WO | 9801208 | 1/1998 |
| WO | 2012177465 | 12/2012 |

* cited by examiner

Primary Examiner — Krishnan S Menon
Assistant Examiner — Bradley R Spies
(74) Attorney, Agent, or Firm — Edward W. Black

(57) ABSTRACT

A thin film composite membrane including a thin film polyamide layer positioned between a porous support and an outer coating, and a humectant; wherein the membrane has an A-value of at least 8 $l/m^2$ hr/bar when tested at 25 $l/m^2$ hr with pure water at 25° C. for one hour, and wherein the outer coating comprises a dissolvable cellulose polymer provided at coverage of at least 10 $mg/m^2$ that substantially dissolves from the membrane after one hour of continuous cross-flow of water at 25 $l/m^2$ hr and 25° C.

2 Claims, No Drawings

COMPOSITE POLYAMIDE MEMBRANE INCLUDING DISSOLVABLE POLYMER COATING

FIELD

The present invention is directed toward thin film composite membranes.

INTRODUCTION

Composite membranes are used in a variety of fluid separations. One type are "thin film composite" (TFC) membranes which include a thin film discriminating layer provided upon an underlying porous support. The thin film layer may be formed by an interfacial polycondensation reaction between polyfunctional amine (e.g. m-phenylenediamine) and polyfunctional acyl halide (e.g. trimesoyl chloride) monomers which are sequentially coated upon the support from immiscible solutions. Examples are described in U.S. Pat. No. 4,277,344 and U.S. Pat. No. 6,878,278. Polymer coatings can be applied to modify the surface properties of the membrane, e.g. to improve fouling resistance. Examples are described in: U.S. Pat. No. 8,002,120 (polyoxazoline), U.S. Pat. No. 6,280,853, U.S. Pat. No. 7,918,349, U.S. Pat. No. 7,815,987, U.S. Pat. No. 7,905,361, US 2011/0259817 and US 2011/0220569 (polyalkylene oxide, blends and derivatives). See also U.S. Pat. No. 617,701 and US 2010/0133172 (cellulosics, polyvinyl alcohol, polyacrylics). In each case, the polymer coating is bonded, adhered or otherwise affixed to the surface of the membrane and its retention on the surface is necessary to maintain the effect. As coatings generally reduce the flux of the membrane, they are not typically used with membranes designed for high flux applications, (e.g. membranes having A-values of greater than 8 $l/m^2$ hr/bar).

Thin film composite membranes are commonly stored wet (e.g. packaged in an aqueous solution optionally including buffers, biocides, preservative, etc. see for example; U.S. Pat. No. 3,744,642, U.S. Pat. No. 4,293,420, U.S. Pat. No. 4,830,885 and U.S. Pat. No. 7,156,997 and the references described therein), or dry (e.g. packaged with a humectant and having a water content less than 5 $g/m^2$), see for example U.S. Pat. No. 4,830,885 and U.S. Pat. No. 4,983,291. The performance characteristics of dry-stored, uncoated membranes change with time. This problem is particularly acute for high A-value membranes, as it is difficult to provide a coating that mitigates storage issues without adversely impacting the high A-value.

SUMMARY

The invention includes a thin film composite membrane designed for high flux applications. The membrane maintains much of its original performance characteristics, even when re-wetted after days or weeks of dry storage. In one embodiment, the thin film composite membrane includes a thin film polyamide layer comprising a reaction product of m-phenylene diamine (mPD) and trimesoyl chloride (TMC) positioned between a porous support and an outer coating, and a humectant. The membrane has a water content less than 5 $g/m^2$ and an A-value of at least 8 $l/m^2$ hr/bar when tested at 25 $l/m^2$ hr with pure water at 25° C. for one hour. The outer coating includes a dissolvable polymer provided at coverage of at least 10 $mg/m^2$ that substantially dissolves from the membrane after one hour of continuous cross-flow of water at 25 $l/m^2$ hr and 25° C. In another embodiment, the invention includes a method of preserving a thin film composite membrane in a dry state including the steps of:

i) adding a humectant to the membrane, ii) coating the thin film polyamide layer of the membrane with a dissolvable polymer provided at coverage of at least 10 $mg/m^2$ that substantially dissolves from the membrane after one hour of continuous cross-flow of water at 25 $l/m^2$ hr and 25° C., iii) and drying the membrane so that its water content less than 5 $g/m^2$.

Many additional embodiments are described including applications for such membranes.

DETAILED DESCRIPTION

The invention is not particularly limited to a specific type, construction or shape of composite membrane or application. For example, the present invention is applicable to flat sheet, tubular and hollow fiber polyamide membranes useful in a variety of applications including forward osmosis (FO), reverse osmosis (RO), nano filtration (NF), ultra filtration (UF), micro filtration (MF) and pressure retarded fluid separations. However, the invention is particularly useful for membranes designed for RO and NF separations, collectively referred to as "hyperfiltration." RO composite membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions—depending upon the species of divalent ion. NF composite membranes also typically reject particles in the nanometer range as well as organic molecules having molecular weights greater than approximately 200 to 500 Daltons.

Examples of composite polyamide membranes include FilmTec Corporation FT-30™ type membranes, i.e. a flat sheet composite membrane comprising a bottom layer (back side) of a nonwoven backing web (e.g. PET scrim), a middle layer of a porous support having a typical thickness of about 25-125 µm and top layer (front side) comprising a thin film polyamide layer having a thickness typically less than about 1 micron, e.g. from 0.01 micron to 1 micron but more commonly from about 0.01 to 0.1 µm. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For hyperfiltration applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 $mg/m^2$. The polyamide layer is preferably prepared by an interfacial polycondensation reaction between a polyfunctional amine monomer (e.g. m-phenylenediamine (mPD)) and a polyfunctional acyl halide monomer (trimesoyl chloride (TMC)). upon the surface of the porous support as described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution. Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer may be applied to the porous support as a polar solution. The polar solution may contain from about 0.1 to about 10 wt % and more preferably from about 1 to about 6 wt % polyfunctional amine monomer. In one set of embodiments, the polar solutions includes at least 2.5 wt % (e.g. 2.5 to 6 wt %) of the polyfunctional amine monomer. Once coated on the porous support, excess solution may be optionally removed.

The polyfunctional acyl halide may be dissolved in a non-polar solvent in a range from about 0.01 to 10 wt %, preferably 0.05 to 3% wt % and may be delivered as part of a continuous coating operation. In one set of embodiments wherein the polyfunctional amine monomer concentration is less than 3 wt %, the polyfunctional acyl halide is less than 0.3 wt %. Representative examples include suitable non-polar solvents include paraffins (e.g. hexane, cyclohexane, heptane, octane, dodecane) and isoparaffins (e.g. ISOPAR™ L). The non-polar solution may include additional constituents including co-solvents, phase transfer agents, solubilizing agents, complexing agents and acid scavengers wherein individual additives may serve multiple functions. Representative co-solvents include: benzene, toluene, xylene, mesitylene, ethyl benzene, diethylene glycol dimethyl ether, cyclohexanone, ethyl acetate, Butyl Carbitol™ acetate, methyl laurate and acetone. A representative acid scavenger includes N, N-diisopropylethylamine (DIEA). The non-polar solution may also include small quantities of water or other polar additives but preferably at a concentration below their solubility limit in the non-polar solution.

Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed). The reaction time of the polyfunctional acyl halide and the polyfunctional amine monomer may be less than one second but contact times typically range from about 1 to 60 seconds. Excess solvent can be removed by air blowing or rinsing the membrane with water and followed by drying at elevated temperatures, e.g. from about 40° C. to about 120° C.

A humectant is dispersed through at least a portion of the membrane. The humectant may be applied to the membrane through a variety of methods including dipping or submerging the membrane into a bath containing the humectant or by way of coating the membrane with a solution containing the humectant. The membrane preferably has a humectant coverage of at least 0.1, 0.5 and in some embodiments, at least 1 g/m$^2$. Representative humectants include glycerin, sorbital and sucrose.

The composite membrane further includes an outer coating located upon the thin film polyamide layer (opposite the porous support). The outer coating comprises at least 10 mg/m$^2$ of a dissolvable cellulose polymer that is preferably water soluble at 25° C. The dissolvable cellulose polymer substantially dissolves from the membrane after one hour of continuous cross-flow of water at 25 l/m$^2$ hr and 25° C. The term "substantially dissolves" means that less than 10% of the dissolvable cellulose polymer remains on the membrane after the membrane is soaked in water at 25° C. for one hour. To characterize the initial coverage of polymer, a known area of membrane may be immersed in boiling water for one hour. The dissolved polymer in water may be concentrated (e.g. by evaporation) and quantified by HPLC. The retention time through an PL Auagel —OH column (8 μm×300 mm) is about 10 min when flowing at 1.0 ml/min. Similarly, the amount of dissolvable cellulose polymer on a pre-soaked membrane (i.e. in water at 25° C. for one hour) may be determined by immersing the membrane in boiling water for one hour and analyzing the residual water via HPLC. Another suitable technique is described in: H. D. Graham, Determination of Carboxymethyl Cellulose in Food Products, Journal of Food Science (1971), p 1052-1055.

Preferred cellulose polymers include those which are water soluble at 25° C. A preferred species includes carboxymethyl cellulose, e.g. Walocel CRT 30 available from The Dow Chemical Company.

The invention further includes a method preserving thin film composite membranes in a dry state, i.e. having a water content less than 5 g/m$^2$. The method including the steps of:

i) adding a humectant to the membrane, ii) coating the thin film polyamide layer of the membrane with a dissolvable polymer provided at coverage of at least 10 mg/m$^2$ that is water soluble at 25° C. and substantially dissolves from the membrane after one hour of continuous cross-flow of water at 25 l/m$^2$ hr and 25° C., and iii) drying the membrane so that its water content less than 5 g/m$^2$.

In yet another embodiment, the method includes an additional step of removing at least 90%, of the dissolvable polymer coating upon the membrane by either soaking the membrane in water or operating the membrane in cross-flow with water. In another embodiment, the dissolvable coating upon the membrane may be removed to less than 1 mg/m$^2$ by soaking the membrane in water or operating the membrane in cross-flow with water.

The invention finds particularly utility with respect to thin film composite membranes designed for high flux applications, i.e. those with relatively high A-values. In particularly, the invention provides a protective outer coating that limits swelling and other deleterious effects associated with dry storage of such membranes and which is subsequently dissolved away before or during initial use such that the membrane maintains a high A-value with little to no increase in B-value.

By way of further explanation, the solvent flux of a hyperfiltration membrane is proportional to the pressure differential across the membrane minus the difference in osmotic pressure between the feed and permeate solutions. See Mulder, Basic Principles of Membrane Technology, $2^{nd}$ Ed. (Kluwer Academic Publishers (1996). For aqueous feeds, water flux ($J_w$) can be defined as:

$$J_w = A(\Delta p - \Delta \pi) \quad \text{(Formula I)}$$

where:

"A" is the water permeability coefficient or "A-value" of the membrane,

"$\Delta p$" is the difference in applied pressure across the membrane (i.e. difference in pressure of feed solution and permeate), and "$\Delta \pi$" the difference in osmotic pressure between the feed solution and permeate at the membrane surfaces.

The composite membranes of the present invention are preferably designed for high flux applications, i.e. the membranes have A-values of at least 8, 8.5, 9, 9.5, 9.8, 9.9, and in some embodiments at least 10 l/m² hr/bar when tested at 25 l/m² hr with pure water for one hour at 25° C.

The solute flux of a hyperfiltration membrane is proportional to the solute concentration differential across the membrane. For sodium chloride containing aqueous feeds, the NaCl flux can be defined as:

$$(J_{NaCl}) = B\Delta c \quad \text{(Formula II)}$$

where:

"B" is the NaCl permeability coefficient or "B-value" of the membrane and

"$\Delta c$" is the difference in solute (NaCl) concentration between the feed solution and permeate at the membrane surfaces.

The composite membranes of the present invention preferably have B-values that do not increase more than 12% and more preferably 10% as a result of dry storage for 80 days at 25° C. In more preferred embodiments, the B-Value of the membrane does increase more than 10% after dry storage at 25° C. for over 30 days.

EXAMPLES

Sample thin film composite membranes were prepared and tested as follows. Polysulfone supports were casts in dimethylformamide (DMF) and subsequently soaked in an aqueous solution meta-phenylene diamine (mPD). The resulting support was then pulled through a reaction table at constant speed while a thin, uniform layer of a non-polar coating solution was applied. The non-polar coating solution included an isoparaffinic solvent (ISOPAR L) and trimesoyl acid chloride (TMC). Excess non-polar solution was removed and the resulting composite membrane was sequentially passed through an aqueous glycerin tank, a water rinse tank, a drying oven and was then coated with various polymeric coatings as identified below in Table 1. Membrane coupons were tested with 2000 ppm NaCl, at 25° C., pH 8, and pressures selected to result in a membrane flux of approximately 30 gfd. Based on the known applied pressure and measured flux and salt passage, the water permeability (A-value) and NaCl permeability (B-value) were calculated using Formulas I and II (expressed as l/m² h/bar). The membranes were then stored dry (at water content less than 5 g/m²) at room temperature for several months after which time A B-values were re-measured. As shown by the result summarized in Table 1, the membranes coated with a water soluble cellulosic polymer experienced little to no increase in B-value.

TABLE 1

| Coating | Coating Wt. (mg/m²) | A-value | B-value | Storage (days) | % change in A-value | % change in B-value |
|---|---|---|---|---|---|---|
| none | — | 8.00 | 0.326 | 83 | 22.8 | 153.1 |
| *PEG/PEOX | 18 | 7.68 | 0.730 | 82 | 7.1 | 13.7 |
| **PEG/PAM | 17 | 5.54 | 0.099 | 75 | 9.3 | 34.3 |
| Polyvinyl alcohol | 35 | 3.79 | 0.168 | 69 | −3.9 | 31.7 |
| Carboxymethyl cellulose (1) | 34 | 8.79 | 0.487 | 84 | 1.4 | −5.9 |
| Carboxymethyl cellulose (2) | 34 | 7.46 | 0.302 | 84 | 10.6 | 9.6 |

*PEG/PEOX refers to the polymer blend of polyethylene glycol and polyoxazoline as described in U.S. Pat. No. 8,002,120.
**PEG/PAM refers to the polymer blend of polyethylene glycol and polyacrylamide described in U.S. Pat. No. 7,815,987.
The Carboxymethyl cellulose used in the examples was Walocel CRT 30.

The invention claimed is:

1. A method of preserving a thin film composite hyperfiltration membrane in a dry state wherein the membrane comprises a thin film polyamide layer having a thickness of from 0.01 to 0.1 μm and comprising a reaction product of m-phenylene diamine (mPD) and trimesoyl chloride (TMC) positioned between a porous support, wherein the method comprises the steps of:

i) adding a humectant to the membrane, ii) coating the thin film polyamide layer of the membrane with a dissolvable cellulose polymer provided at coverage of at least 10 mg/m² which, after drying, would substantially dissolve from the membrane after one hour of continuous soaking in water at 25° C., iii) and drying the membrane so that its water content less than 5 g/m².

2. The method of claim 1 wherein the cellulose polymer is carboxymethyl cellulose.

\* \* \* \* \*